United States Patent
Grass et al.

(10) Patent No.: US 9,841,309 B2
(45) Date of Patent: Dec. 12, 2017

(54) METHOD FOR MEASURING THE FILL LEVEL OF A FLUID

(71) Applicants: Philippe Grass, Regensburg (DE); Stephan Heinrich, Pfeffenhausen (DE); Markus Herrmann, Regensburg (DE); Torsten Reitmeier, Wackersdorf (DE); Denny Schädlich, Neustadt (DE)

(72) Inventors: Philippe Grass, Regensburg (DE); Stephan Heinrich, Pfeffenhausen (DE); Markus Herrmann, Regensburg (DE); Torsten Reitmeier, Wackersdorf (DE); Denny Schädlich, Neustadt (DE)

(73) Assignee: Continental Automotive GmbH, Hannover (DE)

( * ) Notice: Subject to any disclaimer, the term of this patent is extended or adjusted under 35 U.S.C. 154(b) by 355 days.

(21) Appl. No.: 14/398,690

(22) PCT Filed: May 6, 2013

(86) PCT No.: PCT/EP2013/059343
§ 371 (c)(1),
(2) Date: Nov. 3, 2014

(87) PCT Pub. No.: WO2013/167512
PCT Pub. Date: Nov. 14, 2013

(65) Prior Publication Data
US 2015/0107354 A1    Apr. 23, 2015

(30) Foreign Application Priority Data

May 9, 2012 (DE) .......................... 10 2012 207 724

(51) Int. Cl.
*G01F 23/296* (2006.01)
*G01F 23/00* (2006.01)

(52) U.S. Cl.
CPC ...... *G01F 23/2962* (2013.01); *G01F 23/0061* (2013.01)

(58) Field of Classification Search
CPC ............. G01F 23/2962; G01F 23/0061; G01F 23/0069; G01F 23/284
See application file for complete search history.

(56) References Cited

U.S. PATENT DOCUMENTS

| | | | |
|---|---|---|---|
| 4,596,144 A | 6/1986 | Panton | |
| 4,748,846 A | 6/1988 | Haynes | |
| 4,984,449 A * | 1/1991 | Caldwell | ............ G01M 3/3245 73/290 V |
| 5,121,340 A | 6/1992 | Campbell et al. | |

(Continued)

FOREIGN PATENT DOCUMENTS

| | | |
|---|---|---|
| DE | 43 08 373 | 9/1994 |
| GB | 2 100 431 | 12/1982 |

*Primary Examiner* — Lisa Caputo
*Assistant Examiner* — Punam Roy
(74) *Attorney, Agent, or Firm* — Cozen O'Connor

(57) ABSTRACT

In a method for measuring the fill level of a fluid in a housing using an ultrasound sensor, detected multiple echoes in relation to a signal are reflected from a reference point and level echoes in relation to the signal reflected from the fluid level are evaluated in relation to their fluctuation width. The level echoes can be identified in this manner and the fill level determined from the transit times of the signals to the reference point and to the fluid level.

4 Claims, 1 Drawing Sheet

(56) References Cited

U.S. PATENT DOCUMENTS

| | | | |
|---|---|---|---|
| 5,131,271 A * | 7/1992 | Haynes | G01F 23/2962 |
| | | | 181/124 |
| 5,319,974 A * | 6/1994 | Lenz | G01F 1/002 |
| | | | 181/124 |
| 5,793,705 A * | 8/1998 | Gazis | G01F 23/296 |
| | | | 367/98 |
| 6,691,025 B2 * | 2/2004 | Reimer | G01F 23/296 |
| | | | 340/450 |
| 7,421,895 B1 | 9/2008 | Caldwell | |
| 7,542,866 B1 * | 6/2009 | Lovegren | G01F 23/284 |
| | | | 340/618 |
| 2005/0044952 A1 * | 3/2005 | Schroth | G01F 1/007 |
| | | | 73/290 V |
| 2006/0037392 A1 * | 2/2006 | Carkner | G01F 23/2962 |
| | | | 73/290 V |
| 2010/0223019 A1 * | 9/2010 | Griessbaum | G01F 23/284 |
| | | | 702/75 |

* cited by examiner

METHOD FOR MEASURING THE FILL LEVEL OF A FLUID

CROSS REFERENCE TO RELATED APPLICATIONS

This is a U.S. national stage of application No. PCT/EP2013/059343, filed on May 6, 2013. Priority is claimed on German Application No.: DE102012207724.3, filed May 9, 2012, the content of which is incorporated herein by reference.

BACKGROUND OF THE INVENTION

1. Field of the Invention

The present invention relates to a method for measuring the fill level of a fluid in a housing by using an ultrasound sensor, in which the measurement is carried out along a measurement path on which there is a reference point, and in which multiple echoes in relation to the signal reflected from the reference point and level echoes in relation to the signal reflected from the fluid level as a result of multiple measurements and located in the time domain of the multiple echoes are generated.

2. Description of Prior Art

Currently in such fill level measurements, ultrasound sensors are employed. These sensors measure the ultrasound propagation time from the sensor as far as a reference point on a measurement path, which is generally a reflector. With the aid of the known path length from the sensor as far as the reference point and the measured propagation time, the speed of sound, for example, is then calculated. It goes without saying that, here, the distance between measuring housing and reference point must be filled with fluid.

In the actual fill level measurement, the ultrasound propagation time between sensor and the fill level is measured. With the aid of the speed of sound determined via the reference measurement described above, the fill level can then be determined in accordance with the simple formula $s=t*v$.

In the propagation time measurement that is carried out, signal echoes are therefore generated both from the reference point and from the fluid level. Here, multiple echoes are generated in relation to the reference echoes, which means that ping-pong echoes are produced between the transducer of the ultrasound sensor and the reference point. These echoes always follow one another at the same interval according to a multiple of the transducer-reference point path.

Here, the problem arises that the level signal to be measured lies chronologically within the multiple echoes from the reference point. Here, it is not readily possible to distinguish between the various signals (multiple and level echoes), so that, as a result of a lack of an accurate identification of the level echo, it is possible for erroneous measurements to occur.

SUMMARY OF THE INVENTION

An object of the present invention is devising a method with which a particularly exact measurement of the fill level is possible.

According to an aspect of the invention, in a method of the type specified, this object is achieved by the following steps:
- determining the amplitude of the signal echoes and storing the same;
- testing the amplitudes to see whether these lie in a fixed fluctuation range for the multiple echoes from the reference point or in a fixed fluctuation range for the level echoes;
- registering the signal echoes lying in the fluctuation range for the level echoes as level signals, and determining the fill level from the associated propagation time while taking into account the speed of sound determined from the propagation time as far as the reference point.

The inventive method is based on the following considerations. The reference multiple echoes (multiple echo from the reference point) arise as a result of reflections at the reference point, which is formed by a suitable reflector. The reference point is located permanently in the fluid to be measured, so that the reflection is always constant and stable, which means that the reflection angle at the reference surface is always the same. The amplitudes of the multiple echoes therefore fluctuate by only a few percent in height.

During the measurement of the fill level, the ultrasound is reflected at the surface of the fluid. However, the fluid surface is subject to fluctuations. Thus, the reflection at the surface of the fluid is not constant, and the reflection angle changes during each measurement.

The amplitude of the level echo therefore fluctuates relatively highly, for example from 0 V to 5 V. The present invention makes use of these different fluctuation widths. During the performance of the measurement, the amplitude (height of the amplitude) (VPeak) of the signal echoes, in particular of each echo, is determined and the amplitudes are stored. A check is then made as to whether the stored amplitudes lie in a fixed fluctuation range of the multiple echoes from the reference point or in a fixed fluctuation range for the level echoes. The signal echoes lying in the fluctuation range for the level echoes are registered as level signals. Thus, in this way, plausibilization of the individual echoes is possible.

After the identification of the level signals, carried out in this way, the fill level is determined. Here, the fill level is determined from the measured propagation time while taking into account the speed of sound determined from the measured propagation time as far as the reference point.

In a specific embodiment of the method according to the invention, the fill level measurement is carried out on a fluid housing located in a vehicle. Here, as a result of the movement of the vehicle, the fluid surface fluctuates continually, so that a correspondingly large fluctuation range of the level echoes results, since the reflection angle changes accordingly during each measurement.

In the inventive method, multiple measurements are therefore carried out which, as compared with the multiple echoes of the reference signals, lead to level echoes with a large fluctuation width as a result of fluctuations of the fluid level, identification of the level echoes between the multiple echoes of the reference signals being possible as a result of this large fluctuation width.

As far as the fixed fluctuation ranges are concerned, operations are preferably carried out with a fluctuation range for the multiple echoes from the reference point of +/−20 mV and with a fluctuation range for the level echoes of 0-3 V. As far as the reference echoes are concerned, from the multiple echoes from the reference point, the amplitude evaluation is preferably carried out only from the second echo onward. In fact, the amplitudes of these echoes fluctuate only by a few percent, so that a clear delimitation with respect to the level echoes is achievable.

BRIEF DESCRIPTION OF THE DRAWINGS

The invention will be explained in detail below by using an exemplary embodiment in conjunction with the drawings, in which.

DETAILED DESCRIPTION OF THE PRESENTLY PREFERRED EMBODIMENTS

Figure 1:
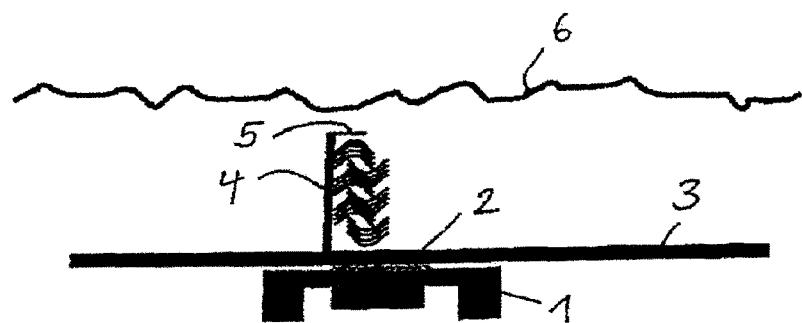
FIG. 1 shows the principle of a fill level measurement in a schematic way.

FIG. 1 shows, schematically, the bottom of a housing 3 that is filled with a fluid, the surface of the fluid being indicated at 6. The level or the height of this fluid in the housing 3 is to be measured.

For the measurement, use is made of an ultrasound sensor, the transducer of which is indicated schematically at 1. The transducer 1 is connected to the bottom of the housing 3 via a coupling 2. Illustrated at 4 is a measurement path for the ultrasound sensor, at the end of which there is a reference point 5 in the form of a reflector. The ultrasound propagation time as far as the reference point 5 and further as far as the surface 6 of the fluid is measured. Since the distance of the reference point 5 from the transducer 1 is known, the speed of sound in the fluid can be determined from the ultrasound propagation time as far as the reference point 5. With the aid of the speed of sound determined in this way and the ultrasound propagation time as far as the surface 6 of the fluid, the fill level (the height of the fluid) in the housing is then determined.

FIG. 1 also shows, schematically, the ultrasound waves transmitted as far as the reference point 5 and reflected from the reference point 5.

During the ultrasound measurement that is carried out, multiple reference echoes (i.e., ping-pong echoes) are produced between ultrasound transducer 1 and reference point 5. These multiple echoes are designated by 7 in FIG. 2. The fill level signal (level signal) 8 to be measured is located chronologically within these multiple echoes 7, it not being readily possible to distinguish between the various multiple and level echoes 7, 8.

Figure 2:
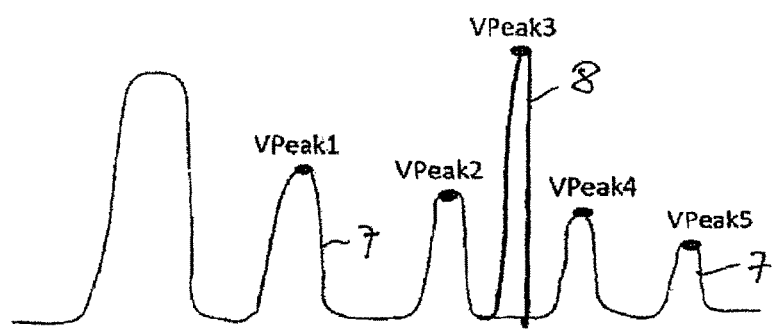
FIG. 2 shows the multiple signal echoes resulting from the reference measurement with a level echo.
Figure 3:
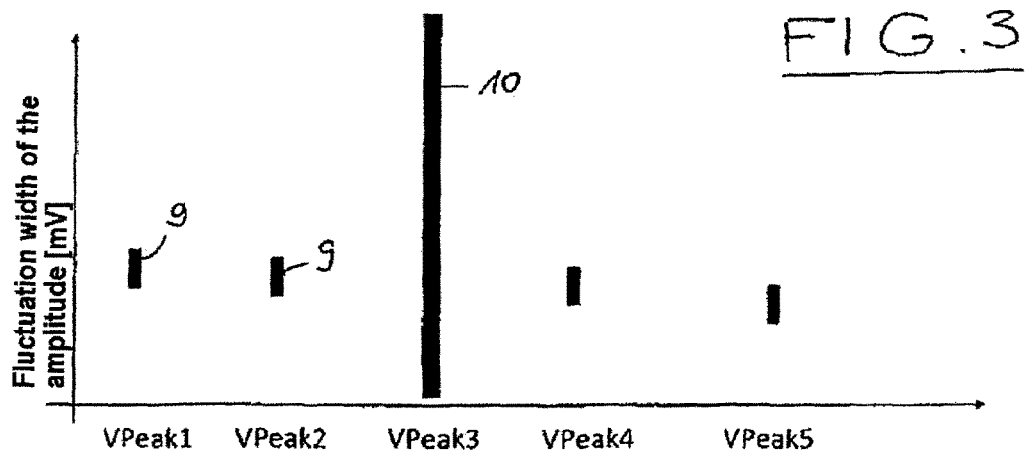
FIG. 3 shows a diagram that shows the fluctuation widths of the amplitudes of the individual echoes.

During the performance of a plurality of fill level measurements, level echoes 8, which change relatively highly on account of fluctuations of the fill level of the fluid, are produced. Such fluctuations are caused, for example, by the movement of a vehicle in which the housing receiving the fluid is located. The fluctuations of the level echoes 8 are, in any case, much greater than those of the multiple echoes 7 of the reference measurement The amplitudes of the various signal echoes (multiple echoes and level echoes) 7, 8 are now measured and stored. By evaluating the fluctuation width of the amplitudes, plausibilization of the individual echoes is then possible. Thus, a check is made to see whether the amplitudes of the respective echoes lie in a fixed fluctuation range for the multiple echoes from the reference point or in a fixed fluctuation range for the level echoes. The signal echoes lying in the fluctuation range for the level echoes are registered as level signals 8. FIG. 3 shows a diagram in which the respective fluctuation widths 9 of the amplitudes of the multiple echoes and the fluctuation width 10 of the amplitude of the level echoes 8 are illustrated. Of the multiple echoes 7, the amplitudes VPeak1, VPeak2, VPeak4, VPeak5 of the second to fifth multiple echoes 7 are illustrated in FIG. 2. Furthermore, the amplitude VPeak3 of a level echo 8.

Following identification of the level echoes 8, the fill level can be calculated from the associated propagation time while taking into account the speed of sound determined from the propagation time as far as the reference point.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for measuring the fill level of a fluid in a housing using an ultrasound sensor, the measurement being carried out along a measurement path on which there is a reference point and in which signal echoes, including multiple reference echoes, in relation to signals reflected from the reference point, and level echoes, in relation to signals reflected from the fluid level, are generated as a result of multiple time domain measurements, the method comprising:

determining amplitudes of the respective signal echoes and storing the amplitudes;

determining whether the stored amplitudes of the signal echoes lie in a fixed fluctuation range for the multiple reference echoes from the reference point or in a fixed fluctuation range for the level echoes; and registering the signal echoes lying in the fluctuation range for the level echoes as level signals, and determining the fill level of the fluid based on an associated echo propagation time based on the speed of sound determined from the propagation time associated with a reference echo as far as the reference point, wherein the method is carried out with a fixed fluctuation range for the multiple reference echoes from the reference point of +/−20 mV.

2. The method as claimed in claim 1, wherein the fill level measurement is carried out on a fluid housing located in a vehicle.

3. The method as claimed in claim 1, wherein the method is carried out with a fixed fluctuation range for the level echoes of 0-3 V.

4. The method as claimed in claim 1, wherein, with respect to the multiple reference echoes, the amplitude evaluation is carried out only from the second echo onward.

* * * * *